United States Patent
Bloch et al.

(10) Patent No.: US 6,169,345 B1
(45) Date of Patent: Jan. 2, 2001

(54) COMPACT DRIVE

(75) Inventors: Jesper Olsen Bloch, Nordborg; John Kristensen, Sønderborg; John Børsting Jensen, Nordborg, all of (DK)

(73) Assignee: Danfoss A/S, Nordborg (DK)

(*) Notice: Under 35 U.S.C. 154(b), the term of this patent shall be extended for 0 days.

(21) Appl. No.: 09/381,567

(22) PCT Filed: Apr. 6, 1998

(86) PCT No.: PCT/DK98/00139
§ 371 Date: Sep. 21, 1999
§ 102(e) Date: Sep. 21, 1999

(87) PCT Pub. No.: WO98/45926
PCT Pub. Date: Oct. 15, 1998

(30) Foreign Application Priority Data

Apr. 10, 1997 (DE) ............................................. 197 14 784

(51) Int. Cl.[7] .................................................. H02K 7/00
(52) U.S. Cl. .................... 310/67 R; 310/68 R; 310/64; 310/89; 310/160; 310/83; 310/99
(58) Field of Search ................................ 310/67 R, 68 R, 310/68 C, 89, 64, 160, 99, 83

(56) References Cited

U.S. PATENT DOCUMENTS

| 4,831,294 | * | 5/1989 | Jussila ..................................... 310/63 |
| 4,908,757 | * | 3/1990 | Jensen et al. ......................... 363/141 |
| 5,202,596 | * | 4/1993 | Jensen et al. ........................... 310/64 |
| 5,714,816 | * | 2/1998 | Jensen et al. ........................... 310/89 |
| 5,814,909 | * | 2/1998 | Yamada et al. ......................... 310/64 |

* cited by examiner

Primary Examiner—Nestor Ramirez
Assistant Examiner—Thanh Lam
(74) Attorney, Agent, or Firm—Lee, Mann, Smith, McWilliams, Sweeney & Ohlson

(57) ABSTRACT

The invention concerns a compact drive with an electric motor, a frequency converter and a gear. Such a drive should be made in the most compact way possible. For this purpose frequency converter is arranged at one front end of the motor and the gear is arranged at the other front end of the motor.

19 Claims, 1 Drawing Sheet

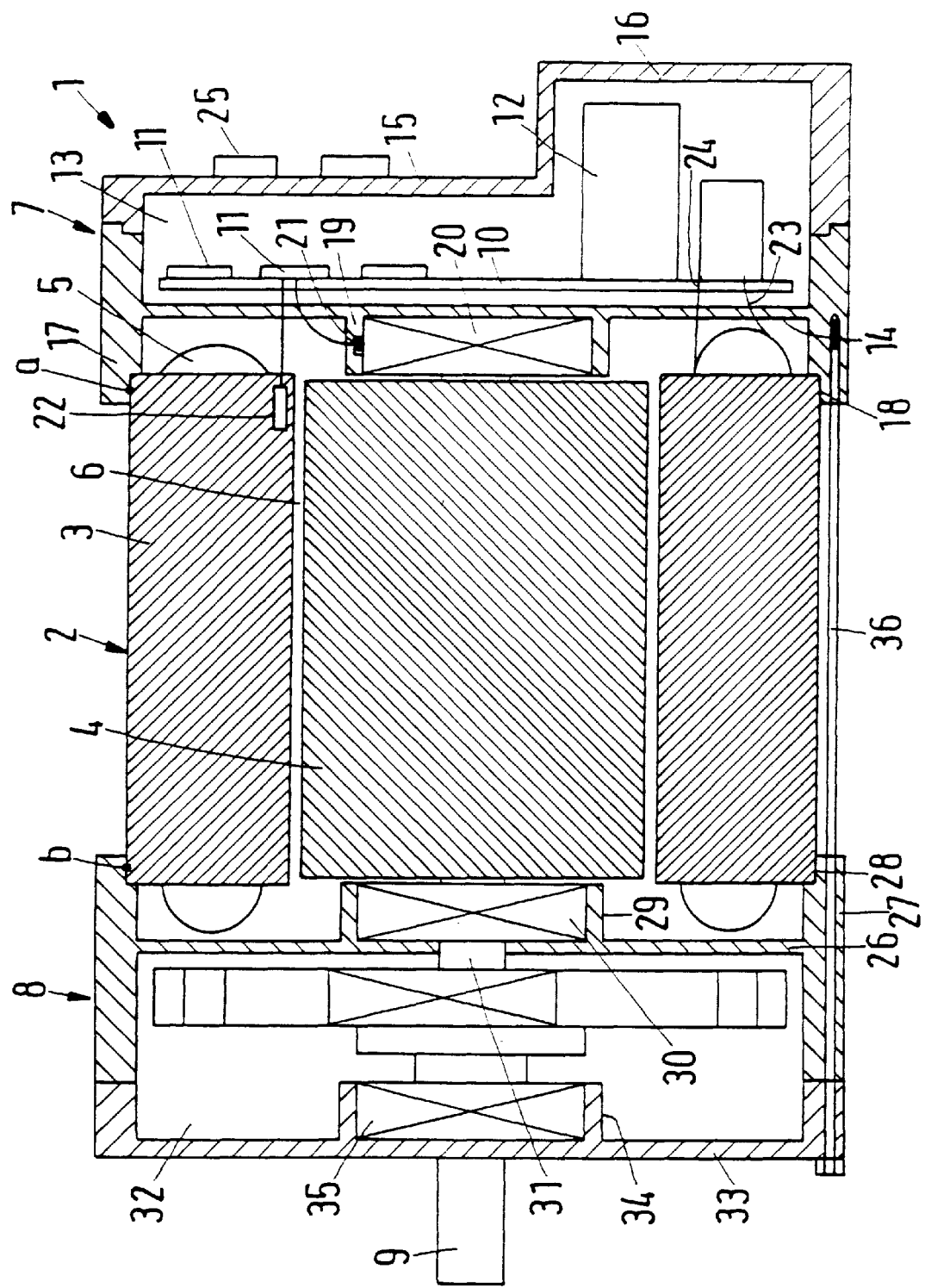

COMPACT DRIVE

The invention concerns a compact drive with an electric motor, a frequency converter and a gear.

The motor is an alternating or a three-pulse current motor. Also permanent magnet motors, switched reluctance motors or direct current motors can be used. The motor is supplied by the frequency converter and delivers its mechanical output via the gear.

The purpose of the invention is to make a compact drive as compact as possible.

In a compact drive as mentioned in the introduction, this is solved in that the frequency converter is arranged at one front end of the motor and the gear is arranged at the other front end of the motor.

This embodiment involves several advantages: Firstly, there is a clear separation between the electrical supply taking place on one side of the motor, and the mechanical power output taking place on the other side of the motor. The length of the drive will increase somewhat due to this measure. However, it can be ensured that both gear and frequency converter have substantially the same cross-sectional area as the motor, so that laterally fitted parts can be avoided. Secondly, the motor will need fewer housing parts, as the front covers of the motor are replaced by the frequency converter and the gear, respectively. Thus also the axial extension of the drive caused by the gear and the frequency converter can be kept within reasonable limits. Further, the production of such a compact drive is more simple. Normally, the stator winding has its connections in the area of a front end of the motor. When the frequency converter is connected here, the cables are kept short. The connections are correspondingly easier to wire and connect. Here, the terms "frequency converter" and "gear" are used as common terms. The frequency converter can be made so that it converts a direct current into a one- or multi-phase alternating current, or converts a one- or multi-phase alternating current into a direct current or an alternating current with a different frequency. The gear converts the mechanical energy defined by the speed and torque of the motor shaft to a different form, that is, a different speed or a different torque, or even to a different sort, for instance hydraulic or pneumatic pressures. In this case the gear is a pump.

In a preferred embodiment it is provided that the frequency converter has a frequency converter housing with a bottom plate of a heat conductive material, which bottom plate is fitted on the stator of the motor. The housing of the frequency converter can therefore be made with reduced stability. The actual stability is obtained in that the housing of the frequency converter is fitted on the stator of the motor. However, the stator of the motor is an extremely stable part, and correspondingly, it also stabilises the housing of the frequency converter via the bottom plate. Usually, the frequency converter is the part of the compact drive producing most heat. This is caused by electrical losses during the frequency conversion, that is, the conversion of a d.c. to an a.c. or the conversion of an alternating voltage. Making at least the bottom plate of a heat conductive material causes that the heat can be distributed and then given off to the surroundings via this bottom plate. In many cases an additional cooling will not be required.

It is also preferred that the gear has a baseplate of a heat conductive material, which baseplate is fitted on the stator of the motor. The facts applying for the bottom plate of the frequency converter also apply for this baseplate. The baseplate is mechanically stabilised by the stator of the motor, which is the mechanically most stable part of the compact drive. The heat produced can be distributed and then given off to the surroundings via this baseplate. The dimensions of the gear housing can be correspondingly weaker, as the motor serves as stabiliser.

Preferably, the bottom plate and/or the baseplate are in heat-conductive connection with the stator. The heat from the frequency converter or the gear, respectively, is no longer just given off to the surroundings. Through the bottom plate and/or the baseplate it can be led into the stator. The stator, which normally has a larger metal mass than the frequency converter, can absorb this heat. Additionally, it also has a larger heat-emitting surface, via which the heat can be given off to the surroundings. This causes that practically no additional cooling measures, such as forced ventilation etc., must be taken. Still, a thermally stable operation is obtained in spite of the compact dimensions.

In a particularly preferred embodiment it is provided that the bottom plate and/or the base plate have a bearing housing for the rotor of the motor. Thus, the rotor is carried in the bottom plate of the frequency converter and/or the baseplate of the gear, respectively. This saves an additional bearing in the gear. The gear "shares" a bearing with the motor. In connection with the frequency converter this has the additional advantage that also via the rotor bearing there is a certain heat emission. Of course, this heat emission is limited, as only a limited heat flow can be transported via the bearing. In total, an additional equalisation of the temperature distribution and a reduction of the peak temperatures can be observed. This construction also facilitates the assembling. The compact drive can be assembled by placing the frequency converter and the gear from both sides on the stator. Thus, the rotor is also automatically carried in the stator.

It is particularly preferred that the bottom plate and/or the baseplate have a circumferential centring projection in the area of its circumferential edges next to the motor, which projection surrounds the stator. This provides that the bottom plate or the baseplate, respectively, are fitted with a predetermined orientation in relation to the stator, so that also the bearing housing for admission of the bearing is oriented concentrically in relation to the stator bore. No further orientation measures are thus required. This facilitates the mounting considerably. Additionally, this measure secures against a lateral displacement of the frequency converter or the gear, respectively, in relation to the motor. The circumferential centring projection can also be interrupted, as long as it secures that the concentric orientation of the frequency converter or the gear, respectively, in relation to the motor is maintained.

It is particularly preferred that the bottom plate and/or the baseplate are made of aluminium. On the one hand aluminium has the desired heat conductivity and on the other hand it has the required mechanical stability for admission of the bearing housing. These advantages are combined with a low weight, so that the compact drive can not only be kept small with regard to its dimensions, but also with regard to its weight.

Advantageously, the frequency converter and the gear are clamped together, thus holding the motor between them. Thus, no additional fixing opportunities are required on the motor. The motor is held between the frequency converter and the gear by means of clamping forces. Fixing opportunities are thus only required on the frequency converter and the gear. This facilitates both the production of the individual parts and the assembling of frequency converter, motor and gear.

It is also advantageous that the circumference of the stator has immediate connection with the surrounding atmosphere. In this connection, a protective shield, that is, a housing, for the motor is abandoned. The circumferential surface of the stator can then be exposed to the surrounding atmosphere, usually the surrounding air. Thus also the occurring heat can quickly and reliably be dissipated, without requiring a forced guiding or a moving of the cooling air. As stated above, a certain amount of heat is also led to the stator from the frequency converter, which will cause the motor to get hot during operation. However, a balance between the heat admission and the heat dissipation occurs, so that the permitted temperatures are not exceeded.

Preferably, the frequency converter has a housing cover, which is substantially adapted to the contour of the components of the frequency converter. This measure offers two advantages: Firstly, this embodiment requires less sealing compound to fill the open volume in the frequency converter to prevent the components of the frequency converter from getting loose or damaged during operation due to vibrations. Secondly, the distances of heat transportation to the outside can be kept small. This provides an improved heat dissipation of the frequency converter and also secures that the frequency converter does not exceed the permitted maximum temperatures.

Preferably, the frequency converter is connected with a temperature sensor and/or a motor shaft angle sensor. The motor shaft angle sensor is practically obvious, as the bottom plate of the frequency converter carries the bearing housing of the rotor. Mounting the frequency converter on the motor will thus provide that this sensor is already in the correct position. The temperature sensor can also be arranged without problems, as the frequency converter is immediately next to the motor. Thus, the temperature sensor can for example be arranged on the stator or on the stator winding.

Advantageously, the gear has a gear cover carrying a bearing housing for a gear shaft. This also provides that the gear, and thus the compact drive, is kept compact.

It is also advantageous that the gear cover is made of aluminium or another heat conductive metal. This provides that in a preferred embodiment the total gear housing is made of aluminium, so that on the one hand sufficient heat can be dissipated to the outside, and on the other hand the required stability is secured. Iron, stainless steel or similar materials can be used in stead of aluminium. In this embodiment the gear housing cannot only dissipate heat produced in the gear. It can also dissipate heat, led into the gear housing via the stator, from the frequency converter to the surroundings.

Preferably, all bearing housings are open in the direction of the motor. This simplifies the fitting. For example, the frequency converter can be fitted on one side of the motor and the gear without gear cover on the other side, the gear housing simply being fitted on the bearing of the rotor. Finally, the gear is closed.

Advantageously, the compact drive is used as steering motor in a vehicle. For this purpose, small dimensions and a low weight are normally desired, and these conditions are met by the compact drive. For example, the compact drive can be used in a fork truck. The compact drive then receives the required control signals from a steering handwheel or a joystick.

In the following the invention is described on the basis of a preferred embodiment in connection with the drawing, showing:

only FIGURE a schematic cross section through a compact drive.

A compact drive 1 has a motor 2 with a stator 3 and a rotor 4. The stator 3 has a stator winding 5. The rotor 4 is rotatably arranged in a stator bore 6 of the stator 3. The motor 2 is an a.c. motor or a three-phase motor.

On one front end, to the right in the FIGURE, a frequency converter 7 is arranged, which converts either a direct current into a one or multi-phase alternating current or an alternating or three-phase current with a certain frequency into an alternating or three-phase current with a different frequency, with the purpose of supplying the motor 2.

On the other front end of the motor 2 a gear 8 is arranged, which has a gear output shaft 9.

The frequency converter has a PCB 10 with the schematically shown electrical components 11, 12, projecting at different lengths from the PCB 10. The PCB 10 is arranged in a chamber 13 limited by a bottom plate 14 and a cover 15. Both the bottom plate 14 and the cover 15 are provided with circumferential walls, enclosing the chamber 13 in the radial direction. The chamber 13 is filled with a sealing compound. This secures the components 11, 12 on the PCB 10 from loosening when the PCB 10 is vibrating.

The cover 15 is made of injection-moulded plastic. The front end turning away from the motor is not plane, but is substantially adapted to the contour of the components. Thus, the cover 15 has a projection 16 admitting the most projecting electrical component 12. As the cover 15 is substantially adapted to the contour of the electrical components 11, 12, the space 13 can be kept as small as possible, so that the required amount of sealing compound remains small. Additionally, this gives short distances between the electrical components 11, 12 and the surrounding air, which facilitates the heat dissipation.

On its side next to the stator, the bottom plate 14 has a circumferential wall 17, which again has a radially inside recess 18. The circumferential wall 17 is fitted on the stator 3 of the motor 2 in a way that the stator 3 extends into the recess 18. A corresponding adaptation of the size relations will cause that the stator is firmly fixed in the bottom plate 14, which results in a heat conducting connection in the area a. Heat produced by the frequency converter can then on the one hand be transported direct to the surroundings, namely via the circumferential surface of the bottom plate 14, on the other hand it can also be led into the stator 3, where a much larger heat dissipation surface is available.

Additionally, a bearing housing 19 is made on the bottom plate 14, in which a bearing 20 for the rotor 4 is arranged. In the bearing housing 19 a motor shaft angle sensor 21 is provided, which is connected with electrical components 11 on the platinum 10. In the stator a temperature sensor 22 is provided, which is also connected with the frequency converter 7. Finally, an additional electrical connection 23, 24 can be seen between the stator winding 5 and the frequency converter 7. An electrical power can be supplied to the frequency converter 7 via schematically shown receptacles 25, which can, for example, be moulded together with the cover to obtain a tight connection.

On the opposite front end the gear 8 has a baseplate 26, which has, like the bottom plate 14 of the frequency converter 7, a circumferential wall 27 with a recess 28. The recess 28 is adapted to the stator 3 in a way that the baseplate 26 can be mounted on the stator 3. Also here a heat conductive connection is obtained in the area b.

The baseplate 26 carries a bearing housing 29 for a bearing 30 of the rotor 4. At the same time the bearing 30 also serves as bearing for a gear shaft 31.

The inner construction of the gear 8 is merely shown schematically. The gear can, for example, be a planetary gearing. Of course, other sorts of gears are also possible.

Being compact in relation to the obtainable transmission, that is, having a large transmission at small volume, and being resistant to large overloads, a Cyclo-gear should be used. The gear can also be replaced by a pump.

The gear inlet shaft 31 is also the rotor shaft, so that both gear 8 and rotor 4 use the same bearing 30.

The individual parts of the gear 8 are arranged in a chamber 32 limited on one side by the baseplate 26 and by a gear cover 33. Both gear cover 33 and baseplate 26 have circumferential walls limiting the chamber 32 in the radial direction.

A bearing housing 34 for a bearing 35 is provided in the gear cover 33, in which bearing the gear outlet shaft 9 is carried.

The gear cover 33 and the baseplate 26 are also made of aluminium. They can, for example, be made as casting or die casting members. The gear 8 itself does not produce an excessive amount of heat. However, the gear housing can then be used to emit heat, which is led to the motor 2 from the frequency converter via the stator 3, to the surroundings.

All bearing housings 34, 29, 19 open in the direction of the motor 2. This facilitates the assembly of the compact drive substantially. For example, the frequency converter 7 can be fitted on the stator 3 from one side, and subsequently the rotor 4 can be inserted in the stator 3, so that it is carried in the frequency converter 7, or rather in the bottom plate 14. Then the gear 8 can be fitted from the other side.

Schematically shown is a bolt 36, which is stuck through the gear cover 33 and the baseplate 26 and screwed into the bottom plate 14. Several of such bolts, for example three, are provided evenly distributed in the circumferential direction. By means of the bolts 36 the frequency converter 7 and the gear 8 are bolted together, thus clamping the motor 2 between them. Further fixing opportunities for the motor 2 are not required, which makes additional working of the motor 2 in this respect superfluous.

In a way not shown, flanges can be heat conductively connected with the gear, particularly the gear cover, the frequency converter or the stator, which flanges can be used to fix the compact drive on a larger unit, for instance a vehicle or a machine. This will improve the heat dissipation even further.

What is claimed is:

1. Compact drive comprising an electric motor, a frequency converter and a gear, the motor having opposite front ends, the frequency converter being located at one front end of the motor and the gear being located at the other front end of the motor, the motor, frequency converter and gear being connected so that heat flows by conduction from the frequency converter to the motor and then to the gear.

2. Compact drive according to claim 1, in which the frequency converter has a frequency converter housing with a bottom plate of a heat conductive material, the bottom plate being fitted on a stator of the motor.

3. Compact drive according to claim 2, in which the bottom plate is in heat-conductive connection with the stator.

4. Compact drive according to claim 2, in which the bottom plate has a bearing housing for the rotor of the motor.

5. Compact drive according to claim 4, in which the bottom plate has a circumferential centering projection in the area of its circumferential edges next to the motor, which projection surrounds the stator.

6. Compact drive according to claim 2, in which the bottom plate is made of aluminum.

7. Compact drive according to claim 2, in which the baseplate is made of aluminum.

8. Compact drive according to claim 1, in which the gear has a baseplate of a heat conductive material, the baseplate being fitted on a stator of the motor.

9. Compact drive according to claim 8, in which the baseplate is in heat-conductive connection with the stator.

10. Compact drive according to claim 8, in which the baseplate has a bearing housing for the rotor of the motor.

11. Compact drive according to claim 10, in which the baseplate has a circumferential centering projection in the area of its circumferential edges next to the motor, which projection surrounds the stator.

12. Compact drive according to claim 1, in which the frequency converter and the gear are clamped together, holding the motor between them.

13. Compact drive according to claim 1, in which the stator has a circumference in immediate connection with the surrounding atmosphere.

14. Compact drive according to claim 1, in which the frequency converter has a housing cover substantially conforming to the contour of components of the frequency converter.

15. Compact drive according to claim 1, in which the frequency converter is connected to at least one of a temperature sensor and a motor shaft angle sensor.

16. Compact drive according to claims 1, in which the gear has a gear cover carrying a bearing housing for a gear shaft.

17. Compact drive according to claim 16, in which the gear cover is made of a heat conductive metal.

18. Compact drive according to claim 1, in which that all bearing housings are open in the direction of the motor.

19. Compact drive according to claim 1, the compact drive being used as a steering motor in a vehicle.

* * * * *